(12) United States Patent
Xing (10) Patent No.: US 7,656,603 B1
(45) Date of Patent: Feb. 2, 2010

(54) PRE-PROGRAMMING OF A PREAMPLIFIER IN A DISK DRIVE TO IMPROVE SERVO-WRITING CHARACTERISTICS

(75) Inventor: Lei Xing, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 62 days.

(21) Appl. No.: 11/948,019

(22) Filed: Nov. 30, 2007

(51) Int. Cl.
*G11B 21/02* (2006.01)
(52) U.S. Cl. .............................. 360/75; 360/46; 360/68
(58) Field of Classification Search ........................ None
See application file for complete search history.

(56) References Cited

U.S. PATENT DOCUMENTS

| | | | |
|---|---|---|---|
| 6,118,614 A * | 9/2000 | Lee .............................. 360/75 |
| 6,268,972 B1 | 7/2001 | Philpott et al. |
| 6,268,974 B1 | 7/2001 | Sloan et al. |
| 6,310,740 B1 | 10/2001 | Dunbar et al. |
| 6,525,892 B1 | 2/2003 | Dunbar et al. |
| 6,891,361 B2 | 5/2005 | Winn |
| 6,943,978 B1 | 9/2005 | Lee |
| 7,027,244 B2 | 4/2006 | Ehrlich |
| 7,068,459 B1 | 6/2006 | Cloke et al. |
| 7,068,461 B1 | 6/2006 | Chue et al. |
| 7,095,576 B2 | 8/2006 | Kim et al. |
| 7,095,577 B1 * | 8/2006 | Codilian et al. ............... 360/46 |
| 7,149,043 B2 | 12/2006 | Ehrlich |
| 7,227,709 B1 | 6/2007 | Pipal et al. |
| 2004/0150906 A1 * | 8/2004 | Yoshimura et al. ............ 360/75 |

* cited by examiner

*Primary Examiner*—Jason C Olson
(74) *Attorney, Agent, or Firm*—Blakely, Sokoloff, Taylor & Zafman (57) ABSTRACT

Disclosed is a self servo-writing disk drive that pre-programs a preamplifier to improve servo-writing characteristics in writing servo sectors to a disk. The disk drive implements operations including: writing servo sectors to define track bands according to sets of write setting values wherein the preamplifier adjusts write signals utilizing a set of write setting values for each track band; reading servo variable gain amplifier values from the tracks bands; selecting a set of write setting values associated with a minimum servo variable gain amplifier value; programming the preamplifier's write settings with the selected set of write setting values; and self-servo writing the disk with servo sectors utilizing the selected set of write setting values that are pre-programmed in the preamplifier.

25 Claims, 9 Drawing Sheets

| Sets | IW | OSD | OSA | SVGA |
|---|---|---|---|---|
| 1 | 15 | 0 | 0 | SVGA1 |
| 2 | 15 | 2 | 2 | SVGA2 |
| 3 | 15 | 4 | 4 | SVGA3 |
| 4 | 15 | 6 | 6 | SVGA4 |
| 5 | 15 | 8 | 8 | SVGA5 |
| 6 | 20 | 2 | 0 | SVGA6 |
| 7 | 20 | 4 | 2 | SVGA7 |
| 8 | 20 | 6 | 4 | SVGA8 |
| 9 | 20 | 8 | 6 | SVGA9 |
| 10 | 20 | 0 | 8 | SVGA10 |
| 11 | 25 | 4 | 0 | SVGA11 |
| 12 | 25 | 6 | 2 | SVGA12 |
| 13 | 25 | 8 | 4 | SVGA13 |
| 14 | 25 | 0 | 6 | SVGA14 |
| 15 | 25 | 2 | 8 | SVGA15 |
| 16 | 30 | 6 | 0 | SVGA16 |
| 17 | 30 | 8 | 2 | SVGA17 |
| 18 | 30 | 0 | 4 | SVGA18 |
| 19 | 30 | 2 | 6 | SVGA19 |
| 20 | 30 | 4 | 8 | SVGA20 |
| 21 | 35 | 8 | 0 | SVGA21 |
| 22 | 35 | 0 | 2 | SVGA22 |
| 23 | 35 | 2 | 4 | SVGA23 |
| 24 | 35 | 4 | 6 | SVGA24 |
| 25 | 35 | 6 | 8 | SVGA25 |

| | WRITE SETTING VALUES REGISTER | | |
|---|---|---|---|
| HEAD-1 | WRITE CURRENT VALUE-1 | OVERSHOOT AMPLITUDE VALUE-1 | OVERSHOOT DURATION VALUE-1 |
| HEAD-2 | WRITE CURRENT VALUE-2 | OVERSHOOT AMPLITUDE VALUE-2 | OVERSHOOT DURATION VALUE-2 |
| ⋮ | ⋮ | ⋮ | ⋮ |
| HEAD-N | WRITE CURRENT VALUE-N | OVERSHOOT AMPLITUDE VALUE-N | OVERSHOOT DURATION VALUE-N |

PRE-PROGRAMMING OF A PREAMPLIFIER IN A DISK DRIVE TO IMPROVE SERVO-WRITING CHARACTERISTICS

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes one or more disks in which each disk has a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between the data sectors around each track of each disk. Each servo sector typically includes a preamble generally having at least a track identification (TKID) field and a sector ID field and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input. Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain a binary encoded sector ID number that identifies each sector of the track. In this way, the servo control system continuously knows where the moveable transducer head is relative to the disk. Further, position error signals (PESs) are often utilized as a feedback signal for the servo control system during track following operations. The PES signal may be derived from read servo bursts as the head flies over the servo bursts of the servo sectors of the disk. The PES signal may be utilized by the servo control system to keep the head near the center of the track.

Servo sectors are typically written to a disk to define the plurality of evenly-spaced, concentric tracks. Servo sectors may be written to a disk either by an external servo writer or by the disk drive itself as part of a self servo-writing process.

As disk drive manufacturers have been forced to increase data capacity in disk drives to remain competitive, a greater number of tracks are required to be servo-written to each disk to provide for the increased data storage capacity. To accomplish this, the distance between each of the servo-written tracks has been made increasingly smaller. However, when the servo sectors are servo-written, due to the required smaller distance between tracks, erase bands often occur that erase portions of the servo sector, such as the preamble and servo bursts. This may result in degraded tracking and seeking performance during disk drive operation.

In typical self servo-writing disk drives, fixed preamplifier write settings for a given class of disk drives are utilized for all of the heads of the disk drives in the self servo-writing of servo sectors. These write settings of the preamplifier may include settings related to write current (IW), write current overshoot amplitude (OSA), and overshoot duration (OSD). Due to the large variation in characteristics among the heads of a given head population (e.g., a particular type or brand of head), a number of heads may produce large erase bands when utilizing these fixed preamp values. It is desirable to find solutions to avoid erase band damage to servo sectors and degraded servo performance.

DETAILED DESCRIPTION

Figure 1:
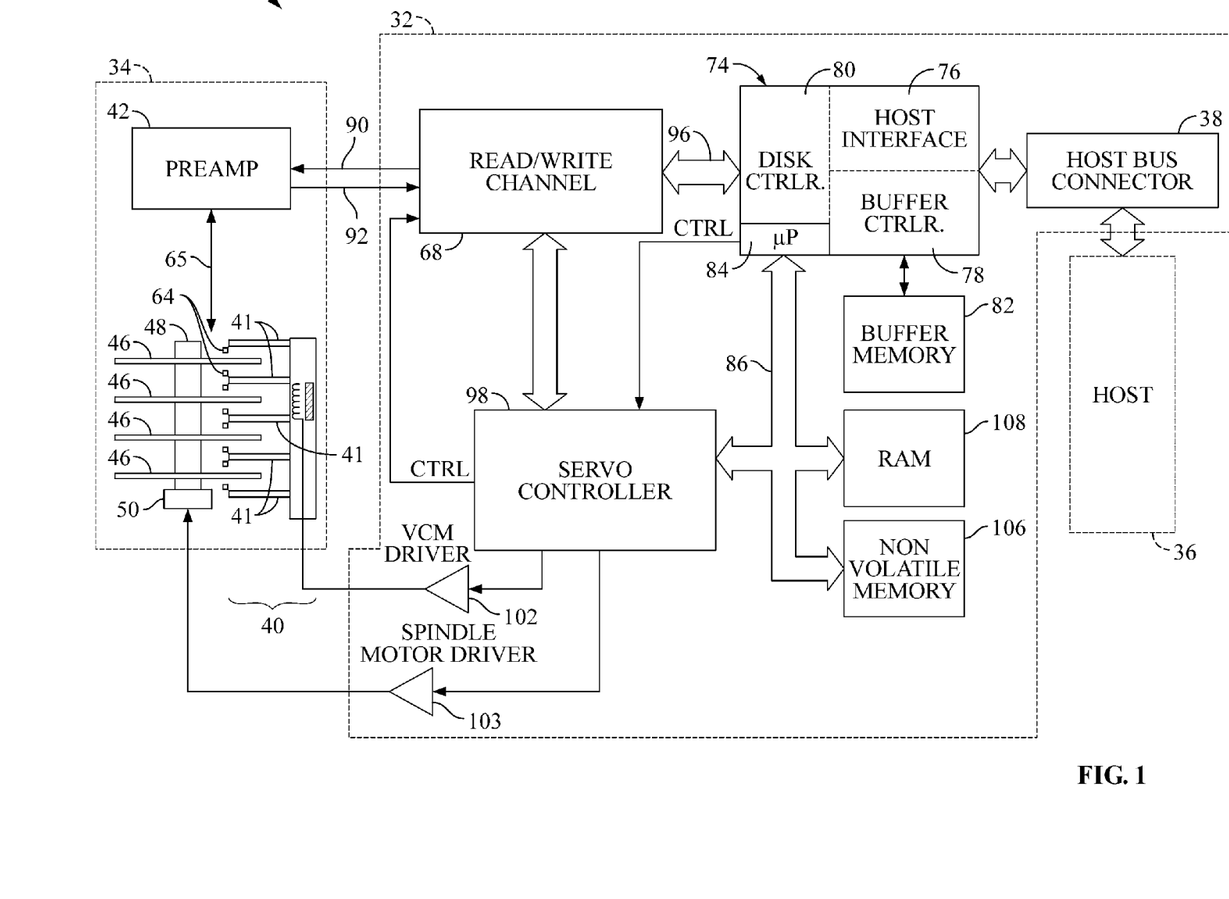
FIG. 1 shows a simplified block diagram of an exemplary disk drive according to one embodiment of the invention.

FIG. 1 shows a simplified block diagram of an exemplary disk drive 30 according to one embodiment of the invention. Disk drive 30 may comprise a head/disk assembly (HDA) 34 and a controller printed circuit board assembly (PCBA) 32.

Host 36 may be a computing device 36 such as a desktop computer, a laptop computer, a mobile computing device (e.g. PDA, camera, cell-phone, etc.), or any type of computing device. Disk drive 30 may be of a suitable form factor and capacity for larger computers or for smaller mobile devices (e.g. a small form factor (SFF) disk drive).

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively.

Preamplifier 42 is connected to channel circuitry of read/write channel 68 in controller PCBA 32 via read data line 92 and write data line 90. Heads 64 are connected to a preamplifier 42 via a cable assembly 65 for reading and writing data on disks 46. Preamplifier 42 may amplify read and write signals from read/write channel 68 for transmission to heads 64. In particular, preamplifier 42 may amplify servo signals associated with the writing of servo sectors by heads 64 to disks 46. Preamplifier 42 may include programmable write settings such as a write current (IW) value, an overshoot amplitude (OSA) value, and an overshoot duration (OSD) value. Further, in one embodiment, preamplifier 42 may include separate preamplifier circuits wherein each head 64 has an associated preamplifier circuit that has its own particular set of programmable write settings.

Controller PCBA 32 comprises read/write channel 68, servo controller 98, host interface and disk controller (HIDC) 74, voice coil motor driver (VCM) 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 may decode data into digital bits transferred on an NRZ bus 96 to HIDC 74. During write operations, HIDC may provide digital data over the NRZ bus to channel 68 which encodes the data prior to its transmittal to preamplifier 42. As one example, channel 68 may employ PRML (partial response maximum likelihood) coding techniques, although other coding processes may also be utilized.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98 to provide position information to microprocessor 84 via bus 86.

Figure 2:
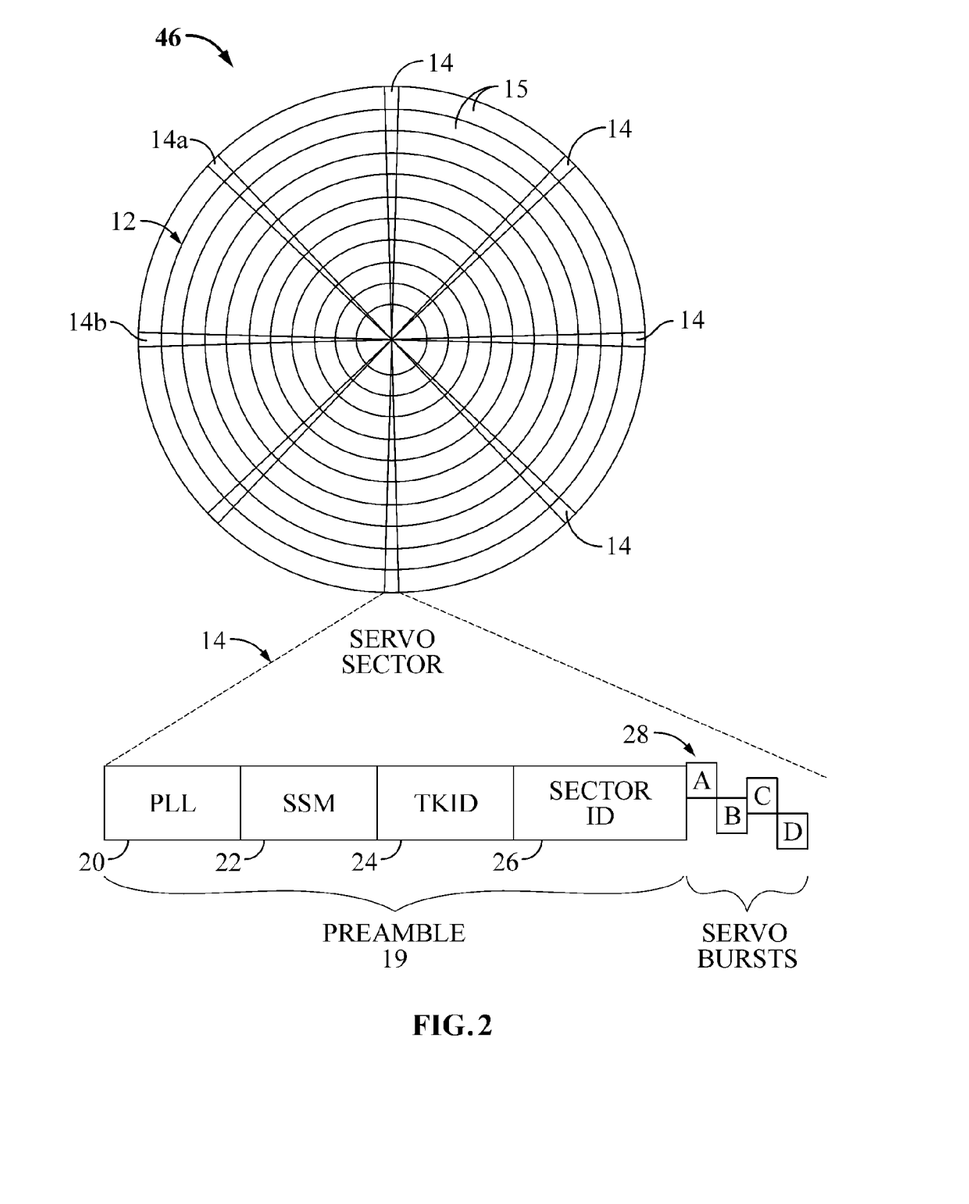
FIG. 2 shows a disk of the disk drive of FIG. 1 having a plurality of concentric tracks, and more particularly, illustrates a disk that has been self servo-written with a plurality of servo sectors in accordance with one embodiment of the invention.

FIG. 2 shows a disk 46 of the disk drive 30 of FIG. 1 having a plurality of concentric tracks, and more particularly, illustrates a disk 46 that has been self servo-written with a plurality of servo sectors 14 in accordance with one embodiment of the invention. FIG. 2 additionally shows exemplary components of a servo sector 14. The plurality of servo sectors 14 are servo-written circumferentially around disk 46 to define circumferential tracks 12 and are utilized in seeking and track following. In particular, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include: a preamble 19 having a phase lock loop (PLL) field 20, a servo synch mark (SSM) field 22, a track identification (TKID) field 24, a sector identifier (ID) 26; and a group of servo bursts (e.g. ABCD) 28 (e.g. an alternating pattern of magnetic transitions) that the servo control system samples to align the moveable transducer head with, and relative to, a particular track. Typically, the servo controller 98 moves the transducer head 64 toward a desired track during a "seek" mode using the TKID field 24 as a control input.

To assist in data consistency, the phase lock loop (PLL) field 20 is generally read first in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM 22. The sector ID 26 is a binary encoded sector ID number to identify the sector.

Further, once head 64 is generally over a desired track 12, servo controller 98 uses the servo bursts (e.g. ABCD) 28 to keep head 64 over the track in a "track follow" mode. During track following mode, head 64 repeatedly reads the sector ID 26 of each successive servo sector to obtain the binary encoded sector ID number that identifies each sector of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

In one embodiment, disk drive 30 may be a self-servo writing disk drive that pre-programs preamplifier 42 to improve servo-writing characteristics in writing servo sectors to a disk. In particular, microprocessor 84 (hereinafter termed processor) of disk drive 30 may operate under the control of a program or routine to execute methods or processes in accordance with embodiments of the invention related to pre-programming preamplifier 42 of disk drive 30 in order to improve servo-writing characteristics. In this way, servo sectors 14 may be written to disk 46, e.g., such as in FIG. 2, to define tracks 12 and for use in disk drive operations, such as seeking, tracking, read/write operations, etc.

It should be appreciated that disk 46 may be pre-written, for example, with a spiral pattern, to provide disk drive 30 with a pattern for servo-writing servo sectors 14 to disk 46 in order to allow servo controller 98 and processor 84 of disk drive 30 to determine location values in order to write servo sectors 14 to the disk 46, as will be described. For example, a spiral pattern may only include the PLL, SSM, and TKID fields of a typical preamble 19 of a servo sector 14. However, it should be appreciated that a wide variety of different types of patterns and methodologies may be utilized to pre-write a disk in order to perform subsequent self servo-writing, as are well known in the art.

In one embodiment, in order to pre-program preamplifier 42 with write settings to improve servo-writing characteristics in writing servo sectors to a disk, processor 84 first commands the writing of servo sectors to define track bands according to sets of write setting values. For example, as previously described, preamplifier 42 may include programmable write settings such as write current (IW) values, overshoot amplitude (OSA) values, and overshoot duration (OSD) values. Preamplifier 42 adjusts the strength of the write signals for writing the servo sectors utilizing the set of write setting values for each track band. Next, processor 84 controls the reading of servo variable gain amplifier (SVGA) values from the track bands. Based upon these read-back SVGA values from the track bands, processor 84 selects a set of write setting values that are associated with a minimum SVGA value. Processor 84 then controls the programming of the write settings of preamplifier 42 with the selected set of write setting values. Processor 84 may then command the self-servo writing of a disk 46 with servo sectors 14 utilizing the selected set of write setting values pre-programmed in the preamplifier 42. In this way, servo sectors 14 may be written to a disk 46, e.g., such as in FIG. 2, to define tracks 12 and for use in disk drive operations, such as seeking, tracking, read/write operations, etc.

It should be appreciated that embodiments of the invention may be implemented with processor 84, servo controller 98, and/or other circuitry of disk drive 30. Particularly, circuitry of the disk drive, including but not limited to processor 84, may operate under the control of a program or routine to execute methods or processes in accordance with embodiments of the invention related to pre-programming preamplifier 42 of disk drive 30 in order to improve servo-writing characteristics. For example, such a program may be implemented in firmware or software (e.g. stored in non-volatile memory 106 or other locations) and may be implemented by processors such as processor 84 and/or other circuitry of disk drive 30. Further, it should be appreciated that the terms processor, microprocessor, circuitry, controller, etc., refer to any type of logic or circuitry capable of executing logic, commands, instructions, software, firmware, functionality, etc.

Figure 3:
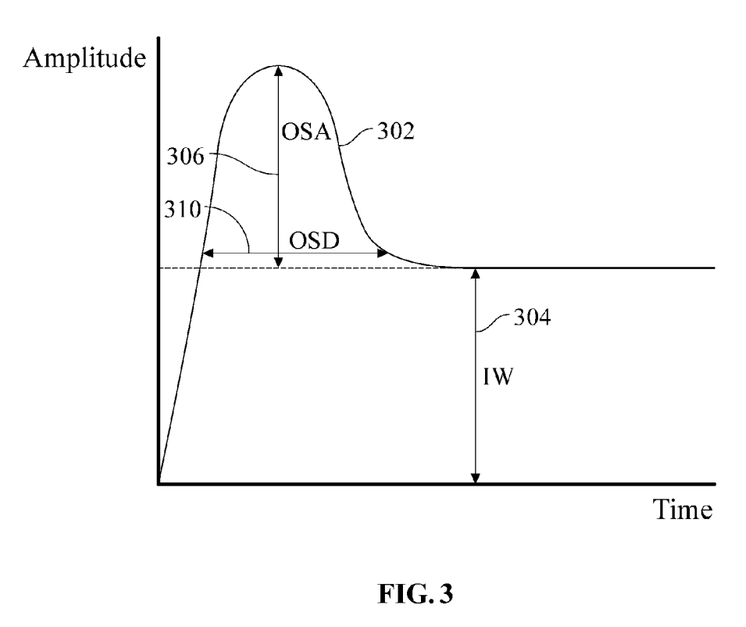
FIG. 3 is an exemplary graph illustrating an example write signal.

In one embodiment, the write settings include write setting values related to: write current (IW), overshoot amplitude (OSA), and overshoot duration (OSD). FIG. 3 is a graph illustrating an example write signal 302 transmitted from preamplifier 42 to head 64 for the writing of a servo sector having IW, OSA, and OSD values. The y-axis represents normalized voltage amplitude and the x-axis represents time. As can be seen in this example, write signal 302 includes an IW value having a voltage amplitude represented by line 304, an OSA value having a voltage amplitude represented by line 306, and an OSD value having a time value represented by line 310.

As will be described, one embodiment of the invention relates to optimally selecting write setting values, such as IW, OSA, OSD values, that are determined to optimally balance media saturation characteristic and erase band characteristics for a disk. Further, as will be described, processor 84 of disk drive 30 may implement operations including defining and/or obtaining an array of sets of write setting values to implement the above-described methodology. In particular, the array may be an orthogonal array, such as, a Taguchi orthogonal array.

Figure 4:
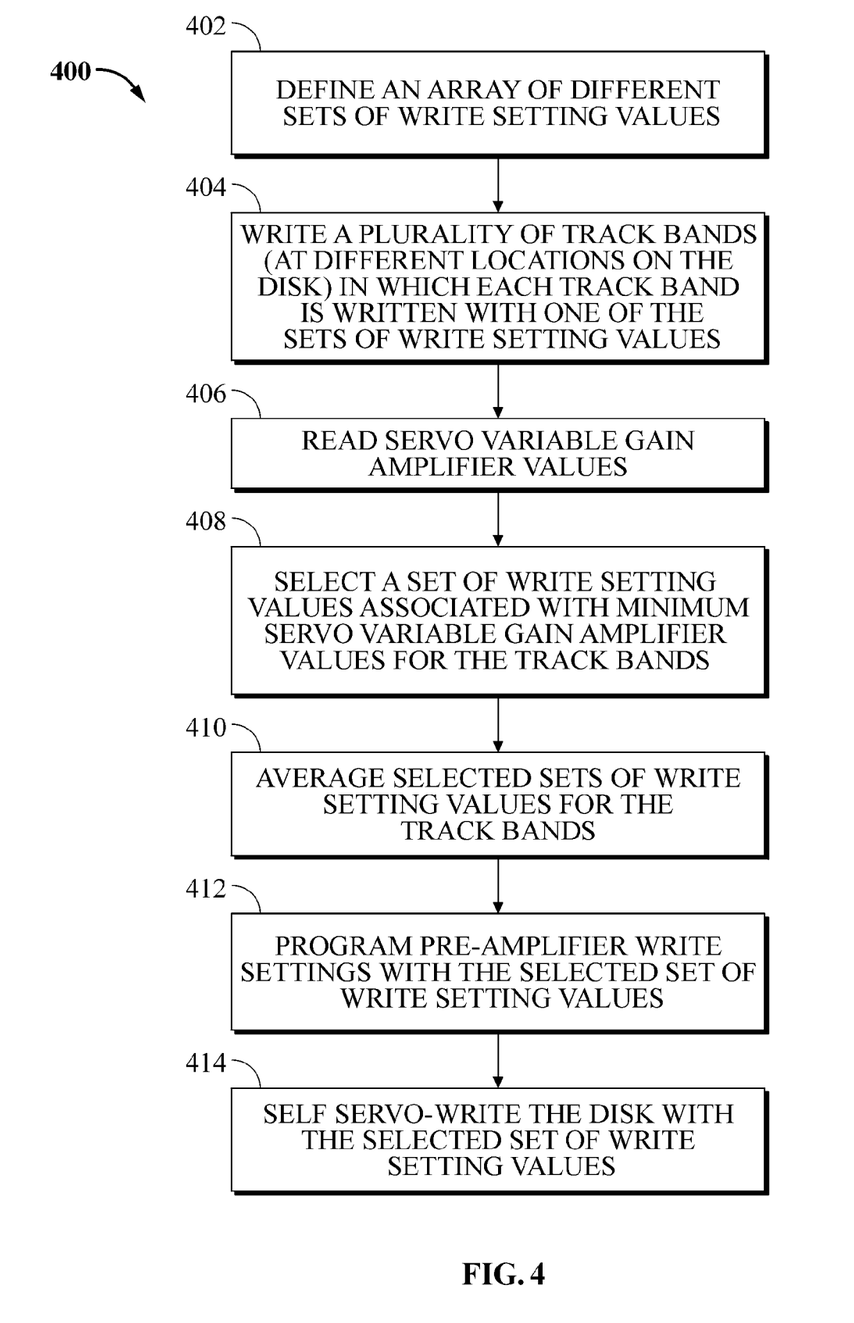
FIG. 4 is a flow diagram illustrating a process that may be utilized to pre-program a preamplifier with write settings to improve servo-writing characteristics, according to one embodiment of the invention.

FIG. 4 is a flow diagram illustrating a process 400 that may be utilized to pre-program a preamplifier with write settings to improve servo-writing characteristics, according to one embodiment of the invention. In one embodiment, process 400 may be implemented by processor 84 of disk drive 30.

At block 402, an array of different sets of write setting values may be defined and/or obtained by the processor for use in process 400. For example, this array of write setting values may be an orthogonal array, such as a Taguchi orthogonal array. The write setting values to be optimized by process 400 may include the IW, OSA, and OSD values previously described.

Figure 5:
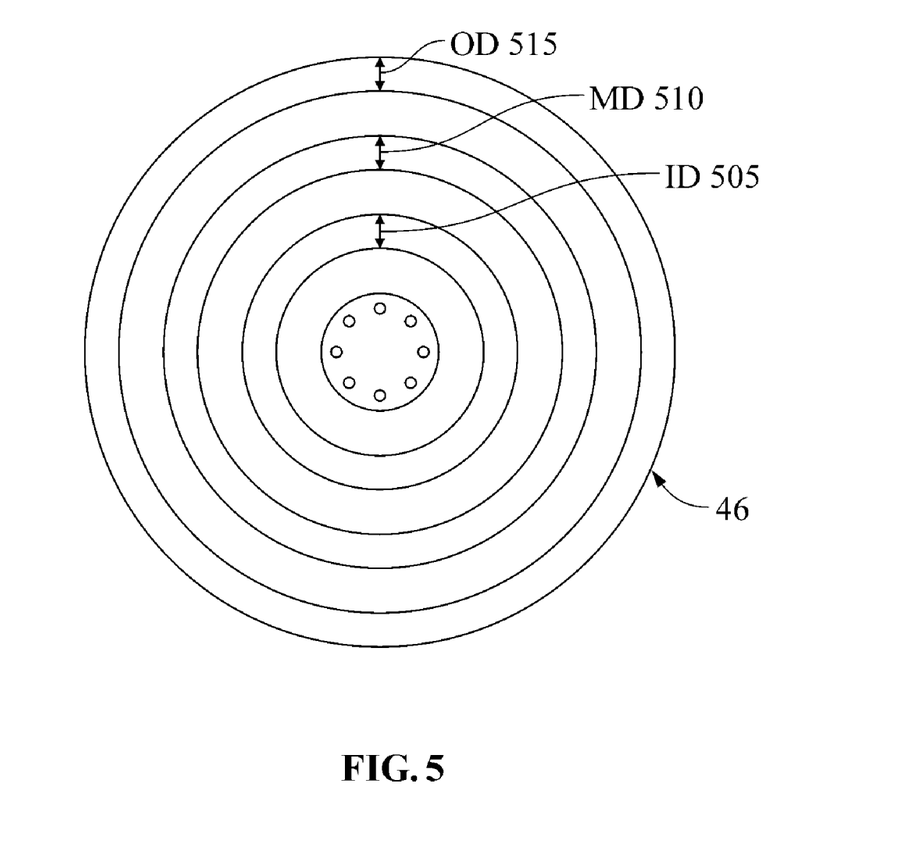
FIG. 5 is an illustration of ID track bands, MD track bands, and OD track bands that are written to a disk, according to one embodiment of the invention.

At process block 404, a plurality of track bands are written at different locations on the disk, e.g., the outer diameter (OD), middle diameter (MD), and inner diameter (ID) of the disk, wherein each track band is written with one of the sets of write setting values. In particular, a set of write setting values from an array, such as a Taguchi orthogonal array, may be selected for each track band that is written at the OD, MD, and ID. As an example, with reference to FIG. 5, an illustration of ID track bands 505, MD track bands 510, and OD track bands 515 are shown written to disk 46 in which each track band is written with one of the sets of write setting values. In particular, track bands for each of the sets of write setting values from the Taguchi orthogonal array may be written for the ID track bands 505, MD track bands 510, and OD track bands 515. Alternatively, track bands may be written at other portions of the disk.

After the writing of all the track bands at the ID, MD, and OD, servo variable gain amplifier (SVGA) values are read (block 406). In particular, servo variable gain amplifier (SVGA) values are read for each track band by the processor and servo controller.

At block 408, a set of write setting values are selected that are associated with minimum SVGA values for the different track bands. For example, a set of write setting values may be selected that are associated with minimum SVGA values for each of the OD, MD, and ID track bands, respectively. Then, the selected sets of write setting values for the different track bands may be averaged yielding an optimized set of write setting values (block 410) for the disk. For example, the selected sets of write setting values for the OD, MD, and ID track bands may be averaged yielding an optimized set of write setting values for the disk. Alternatively, instead of averaging, individualized sets of write setting values for the different sections (e.g., OD, MD, and ID) of the disk may be utilized.

At block 412, the preamplifier may be programmed with the averaged selected sets of write setting values of the different track bands.

At block 414, the disk of the disk drive is self servo-written with servo sectors with the preamplifier being programmed with the optimized selected set of write setting values. For example, as previously described with reference to FIG. 2, a disk 46 is servo-written with servo sectors 14 to define tracks 12. In one embodiment, before servo sectors 14 are servo-written, the OD, MD, and ID track bands utilized to formulate the optimized write setting values may be erased.

Figure 6:
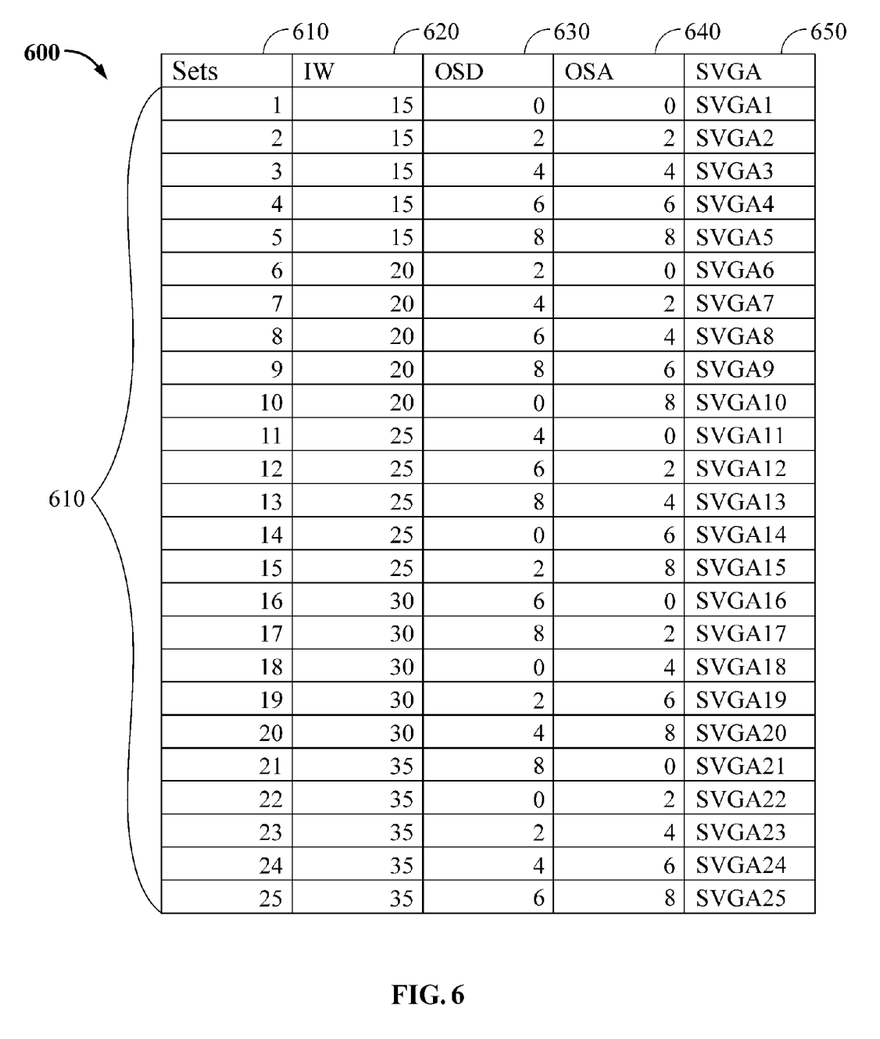
FIG. 6 is a table illustrating an example of a Taguchi orthogonal array that may be utilized with embodiments of the invention.

FIG. 6 is a table 600 illustrating an example of a Taguchi orthogonal array that may be utilized as an array in one embodiment of the invention. In this example, table 600 includes 25 different sets of write setting values 610 wherein for each set of write setting values there are three corresponding write setting values: IW 620, OSD 630, and OSA 640. As previously described, a set of write setting values from the Taguchi orthogonal array 600 may be selected for each track band and servo sectors are written to define the track band. In particular, the preamplifier is temporarily programmed with the write setting values and adjusts the write signals based upon these write setting values in writing the servo sectors. In particular, as previously described, track bands are written with each of the sets of write setting values 610 from the Taguchi orthogonal array 600 at the OD, MD, and ID of the disk. Servo variable gain amplifier (SVGA) values are then read back from each of the track bands. Thus, each set of write setting values 610 for each track band has an associated servo variable gain amplifier (SVGA) value 650. Further, SVGA values can be calculated for each location on the disk, e.g., OD, MD, and ID.

Figure 7:
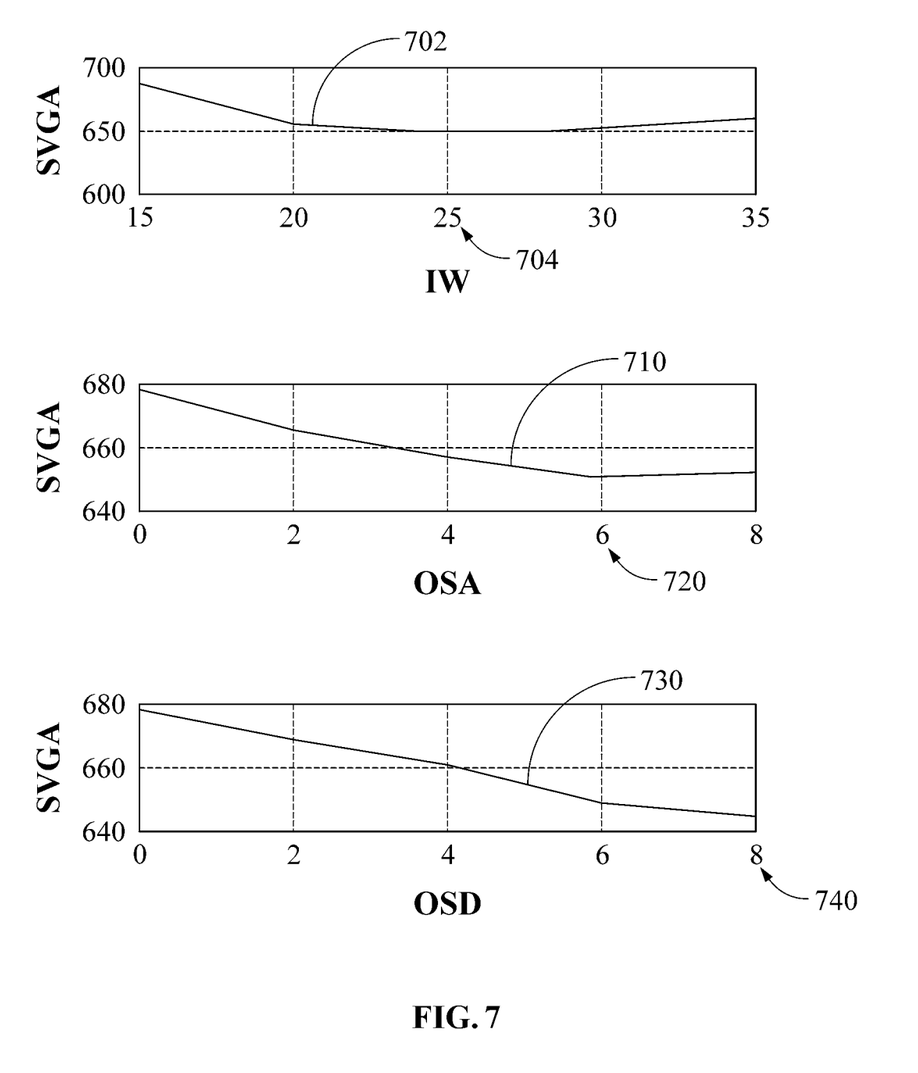
FIG. 7 illustrates graphs showing example read-back servo variable gain amplifier (SVGA) values (y-axis) versus IW, OSA, and OSD write setting values from the Taguchi orthogonal array (x-axis), respectively, according to one embodiment of the invention.

FIG. 7 illustrates three graphs 704, 720, and 740 showing example read-back servo variable gain amplifier (SVGA) values (y-axis) versus IW, OSA, and OSD write setting values from the Taguchi orthogonal array (x-axis), respectively. In this embodiment, the SVGA values of the y-axis may be in digital to analog conversion (DAC) units that correlate and are normalized with respect to the preamplifier.

As can be seen in FIG. 7, representative curves 702, 710, and 730 are shown that represent an example relationship of the read-back SVGA values from the servo controller to the IW, OSA, and OSD values, respectively. In particular, it can be seen that a minimum SVGA value for IW may be found by curve 702 of graph 704 as an IW value of 25. Further, it can be seen that a minimum SVGA value for OSA may be found by curve 710 of graph 720 as an OSA value of 6. Moreover, it can be seen that a minimum SVGA value for OSD may be found by curve 730 of graph 740 as an OSD value of 8. Thus, based upon read-back SVGA values, optimal IW, OSA, and OSD values may be found for a set of track bands (e.g., IW: 25, OSA: 6, and OSD: 8). This can be done for the sets of track bands at each of the OD, MD, and ID of the disk.

Based upon these determined different sets of write setting values associated with minimum SVGA values that are determined at the OD, MD, and ID of the disk, these write setting values may further be averaged and these averaged values may be programmed into the preamplifier's write settings for the disk drive. Therefore, as an example, preamplifier 42 of disk drive 30 of FIG. 1, may be programmed with IW, OSA, and OSD write setting values that were optimally determined for track bands at the OD, MD, and ID of the disk 46 utilizing a Taguchi orthogonal array and were then further averaged across the OD, MD, and ID of the disk to be averaged for the whole disk.

Further, utilizing FIG. 1 as an example, it should be appreciated that the previously-described methodology may be applied for a disk drive 30 including multiple heads 64, wherein each head 64 is associated with a respective disk 46 and preamplifier. Preamplifier 42 may include separate preamplifier circuits associated with each head 64 each having its own particular set of programmable write setting values.

Figure 8:
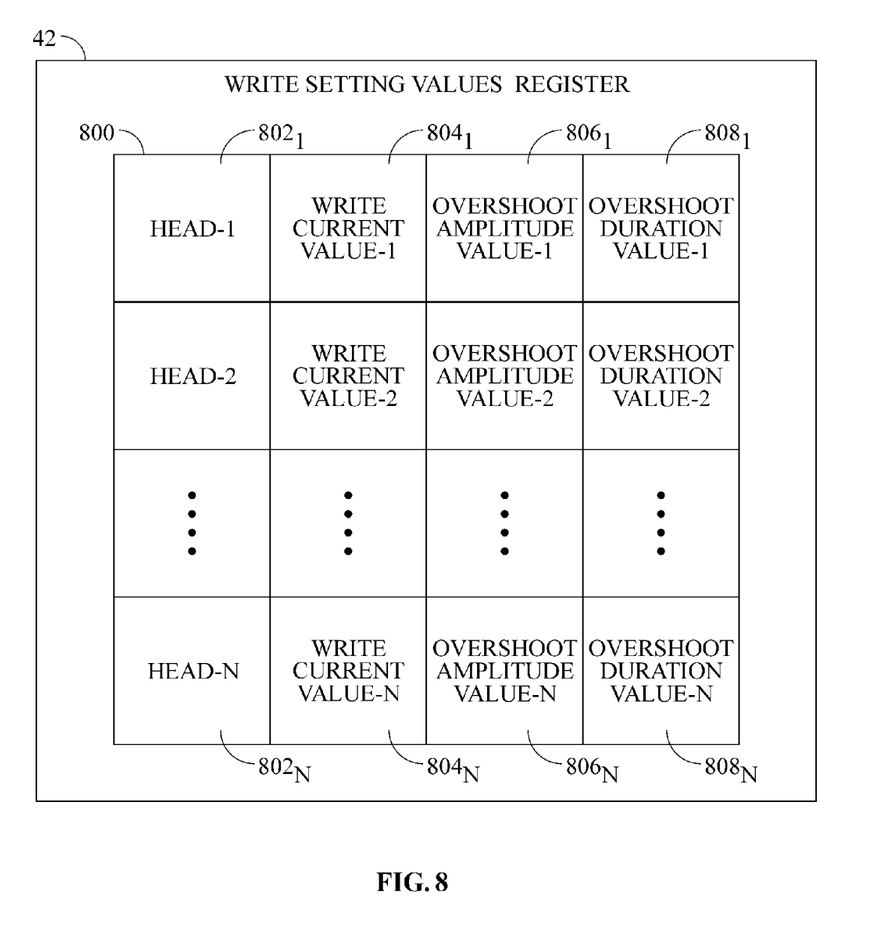
FIG. 8 is a diagram showing a table of write setting values that may be stored in a register of preamplifier for different preamplifier circuits, according to one embodiment of the invention.

In particular, in the multiple head embodiment, the previously-described process 400 may be performed for each head 64 and disk 46 combination and the associated preamplifier circuit may be programmed with the determined set of write setting values. For example, FIG. 8 is a diagram showing a table of write setting values that may be stored in a register 800 of preamplifier 42 for the different preamplifier circuits. It should be appreciated that preamplifier 42 may consist of a plurality of different preamplifier circuits associated with each of the heads of the disk drive (e.g., head-1 . . . head-N). As can be seen in FIG. 8, write setting value register 800 may include a plurality of rows $802_{1-N}$ corresponding to each head (e.g. head-1 . . . head-N) and for each head there is a corresponding write current (IW) value $804_{1-N}$, a corresponding overshoot amplitude (OSA) value $806_{1-N}$, and a corresponding overshoot duration (OSD) value $808_{1-N}$. Accordingly, each preamplifier circuit associated with each head of the disk drive may include pre-programmed write setting values determined to be optimal in accordance with the previously-described methodology.

Figure 9A:
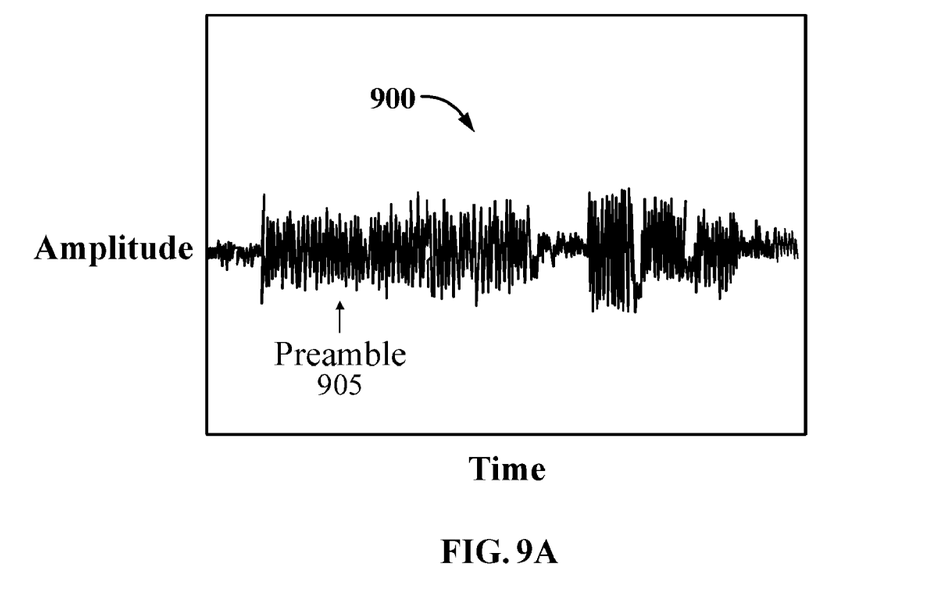
FIG. 9A is a graph illustrating an example amplitude of the read-back servo variable gain amplifier (SVGA) values for an exemplary preamble of a servo sector.

As an illustration, FIG. 9A is a graph 900 illustrating the amplitude (y-axis) of the read-back servo variable gain amplifier (SVGA) values versus time (x-axis) for a preamble 905 of a servo sector written without the previously-described optimization process. As can be seen in FIG. 9A, the preamble amplitude 905 shows one example of erase band damage.

Figure 9B:
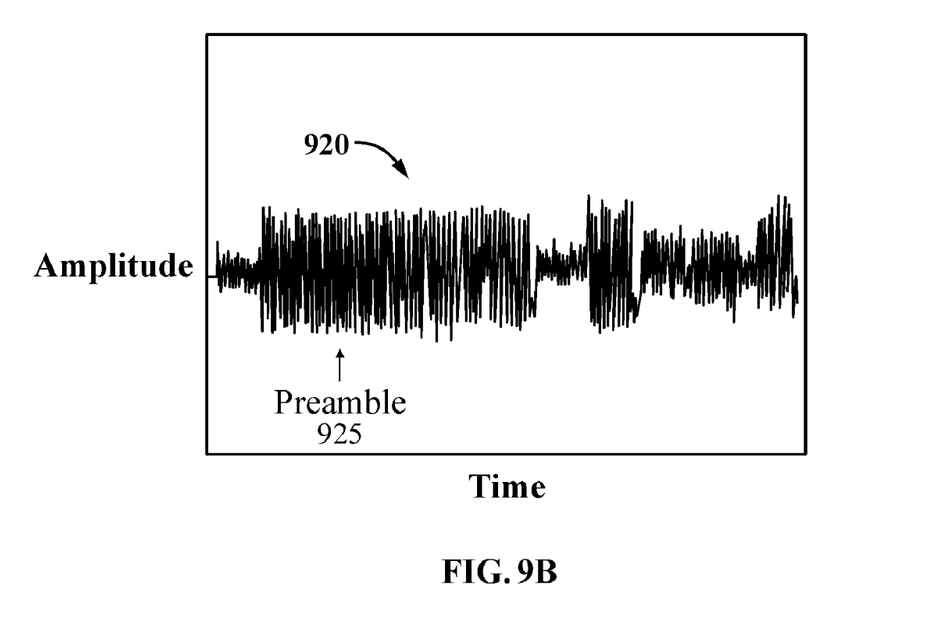
FIG. 9B is a graph illustrating an example amplitude of the read-back servo variable gain amplifier (SVGA) values for an exemplary preamble of a servo sector that has been written with a preamplifier that has been programmed with optimized write setting values according to one embodiment of the invention.

FIG. 9B illustrates an example of the read-back SVGA amplitude that is read-back from a servo sector that has been written with a preamplifier that has been programmed with optimized write setting values, determined in accordance with the previously-described optimization process. Graph 920 shows an example where the read-back preamble 925 is not significantly damaged by an erase band. It will be apparent to one of skill in the art that FIGS. 9A and 9B are examples for illustration purposes and that actual signal characteristics and amplitudes may vary according to embodiments of the invention.

The previously-described process may be implemented by a program or routine implemented by the processor or other circuitry of the disk drive itself.

It should be appreciated that components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium. Further, the "processor readable or accessible medium" may include any medium that can store, transmit, or transfer information. Examples of accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes previously described can be employed for disk drives with embedded servo systems. However, numerous alternatives for disk drives with similar or other media format characteristics can be employed by those skilled in the art to use the invention with equal advantage to implement these techniques. Further, although embodiments have been described in the context of a disk drive with embedded servo sectors, the invention can be employed in many different types of disk drives having a head that scans the media.

What is claimed is:

1. A self servo-writing disk drive that pre-programs a preamplifier to improve servo-writing characteristics, the self servo-writing disk drive comprising:
    a head to write and read servo sectors to and from a disk;
    a preamplifier coupled to the head to amplify servo signals associated with the servo sectors, the preamplifier having preamplifier write settings that are programmable;
    a processor to implement operations including:
        writing servo sectors to define track bands according to sets of write setting values, the preamplifier adjusting write signals utilizing a set of write setting values for each track band;
        determining servo variable gain amplifier values associated with the tracks bands;
        selecting a set of write setting values associated with a minimum servo variable amplifier gain;
        programming the preamplifier write settings with the selected set of write setting values; and
        self servo-writing the disk with servo sectors utilizing the selected set of write setting values.

2. The disk drive of claim 1, wherein the write setting values include at least one of a write current value, an overshoot amplitude value, and an overshoot duration value.

3. The disk drive of claim 2, wherein the write setting values are selected to optimally balance media saturation characteristics and erase band characteristics for the disk.

4. The disk drive of claim 1, the processor to implement further operations including obtaining an orthogonal array of sets of write setting values.

5. The disk drive of claim 4, wherein the orthogonal array is a Taguchi orthogonal array.

6. The disk drive of claim 4, wherein a set of write setting values from the orthogonal array is selected for each track band.

7. The disk drive of claim 1, wherein OD track bands are written near an outer diameter (OD) of the disk, MD track bands are written near a middle diameter (MD) of the disk, and ID track bands are written near an inner diameter (ID) of the disk.

8. The disk drive of claim 7, wherein a set of write setting values associated with a minimum servo variable gain amplifier value are selected and averaged for the OD track bands, the MD track bands, and the ID track bands, and the preamplifier write settings are programmed with the averaged write setting values.

9. The disk drive of claim 1, wherein the servo sector includes at least a preamble and a plurality of servo bursts.

10. The disk drive of claim 1, further comprising a plurality of heads, wherein each head is associated with a respective disk and a preamplifier, wherein, for each head, the associated preamplifier is programmed with a selected set of write setting values associated with a minimum servo variable gain amplifier value for the associated disk.

11. In a self-servo writing disk drive that includes a head to write and read servo sectors to and from a disk and a preamplifier coupled to the head, the preamplifier to amplify servo signals associated with the servo sectors and having preamplifier write settings that are programmable, a method to pre-program the preamplifier with optimized preamplifier write settings to improve servo-writing characteristics, the method comprising:
    writing servo sectors to define track bands according to sets of write setting values, the preamplifier adjusting write signals utilizing a set of write setting values for each track band;
    determining servo variable gain amplifier values associated with the tracks bands;
    selecting a set of write setting values associated with a minimum servo variable gain amplifier value;
    programming the preamplifier write settings with the selected set of write setting values; and
    self servo-writing the disk with servo sectors utilizing the selected set of write setting values.

12. The method of claim 11, wherein the plurality of write setting values include at least one of a write current value, an overshoot amplitude value, and a overshoot duration value.

13. The method of claim 12, further comprising selecting write setting values to optimally balance media saturation characteristics and erase band characteristics for the disk.

14. The method of claim 11, further comprising obtaining an orthogonal array of sets of write setting values.

15. The method of claim 14, wherein the orthogonal array is a Taguchi orthogonal array.

16. The method of claim 14, wherein a set of write setting values from the orthogonal array is selected for each track band.

17. The method of claim 11, further comprising:
    writing a first set of OD track bands near an outer diameter (OD) of the disk;
    writing a second set of MD track bands near a middle diameter (MD) of the disk; and writing a third set of ID track bands near an inner diameter (ID) of the disk.

18. The method of claim 17, further comprising:
    selecting a set of write setting values associated with a minimum servo variable gain amplifier value for the OD track bands, the MD track bands, and the ID track bands;
    averaging the selected sets of write setting values for the OD track bands, MD track bands and ID track bands; and
    programming the preamplifier write settings of the preamplifier with the averaged write setting values.

19. The method of claim 11, wherein the servo sector includes at least a preamble and a plurality of servo bursts.

20. The method of claim 11, wherein the disk drive includes a plurality of heads, each head being associated with a respective disk and a preamplifier, wherein, the method further comprises programming the associated preamplifier of each head with a selected set of write setting values associated with a minimum servo variable gain amplifier value for the associated disk.

21. A self servo-writing disk drive that pre-programs a preamplifier to improve servo-writing characteristics, the self servo-writing disk drive comprising:
    a head to write and read servo sectors to and from a disk;
    a preamplifier coupled to the head to amplify servo signals associated with the servo sectors, the preamplifier having preamplifier write settings that are programmable;

means for writing servo sectors to define track bands according to sets of write setting values, the preamplifier adjusting write signals utilizing a set of write setting values for each track band;

means for determining servo variable gain amplifier values associated with the tracks bands;

means for selecting a set of write setting values associated with a minimum servo variable gain amplifier value;

means for programming the preamplifier write settings with the selected set of write setting values; and means for self servo-writing the disk with servo sectors utilizing the selected set of write setting values.

22. The disk drive of claim 21, wherein the write setting values include at least one of a write current value, an overshoot amplitude value, and an overshoot duration value.

23. The disk drive of claim 21, further comprising means for obtaining an orthogonal array of sets of write setting values.

24. The disk drive of claim 23, wherein the array is a Taguchi orthogonal array.

25. The disk drive of claim 21, wherein OD track bands are written near an outer diameter (OD) of the disk, MD track bands are written near a middle diameter (MD) of the disk, and ID track bands are written near an inner diameter (ID) of the disk.

* * * * *